Jan. 4, 1927.
G. P. GREGORY
1,613,166
STRAINER
Filed Oct. 20, 1925    2 Sheets-Sheet 1
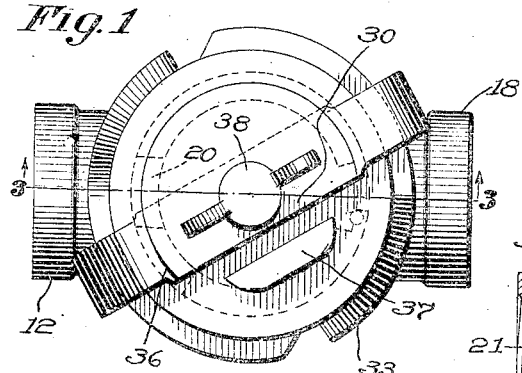
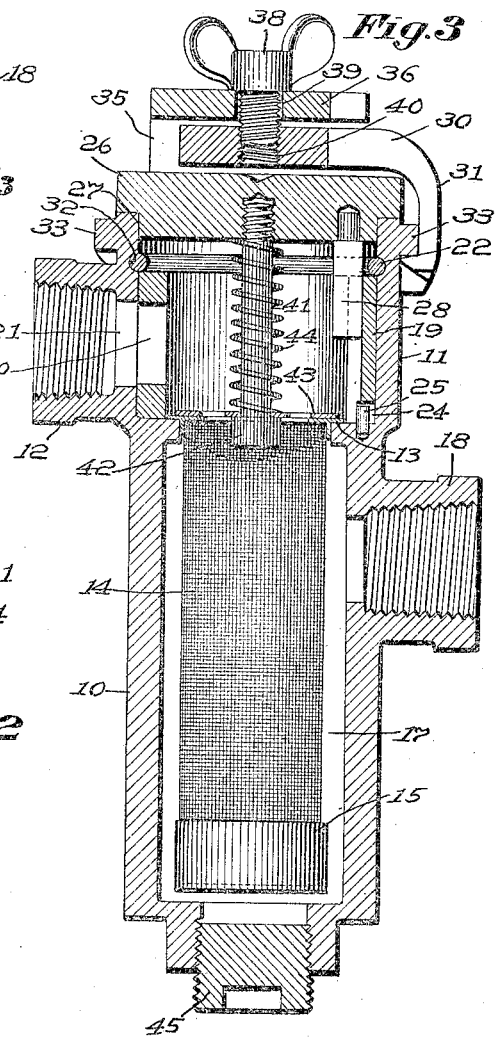
INVENTOR:
George P. Gregory
BY Roff D. Haws
ATTORNEY Jan. 4, 1927.  
G. P. GREGORY  
STRAINER  
Filed Oct. 20, 1925  
1,613,166  
2 Sheets-Sheet 2
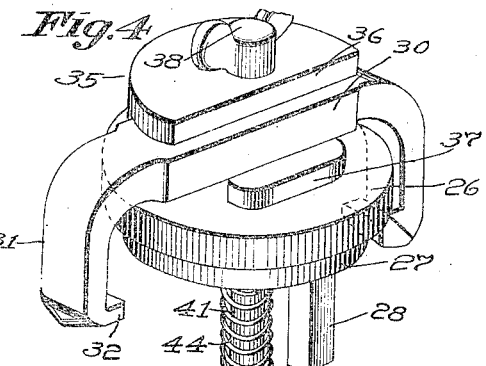
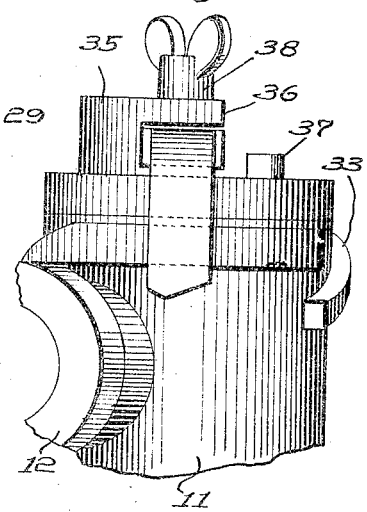
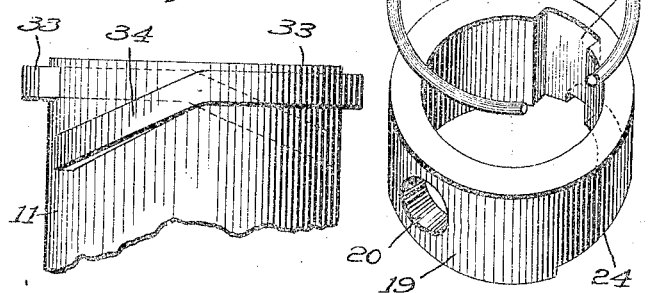
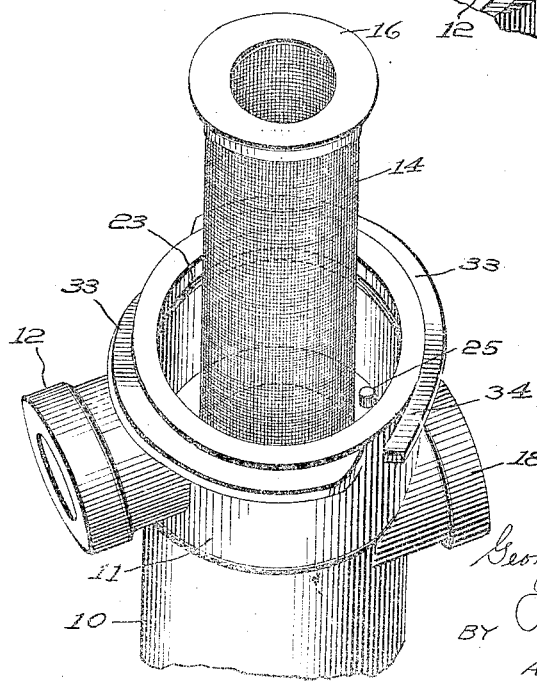
INVENTOR  
George P. Gregory  
BY  
ATTORNEY Patented Jan. 4, 1927.

1,613,166

UNITED STATES PATENT OFFICE.

GEORGE P. GREGORY, OF PITTSFIELD, MASSACHUSETTS, ASSIGNOR TO THE BOSTON AUTO GAGE COMPANY, OF PITTSFIELD, MASSACHUSETTS, A CORPORATION OF MASSACHUSETTS.

STRAINER.

Application filed October 20, 1925. Serial No. 63,634.

This invention relates to strainers of the type adapted to be connected to a pipe line to strain the liquid or gaseous fluid passing therethru.

Strainers of this general type as constructed heretofore commonly consist of an enclosing casing thru which the liquid passes, and a strainer element within the casing serves to catch the dirt and foreign particles within the liquid. The strainer element may become clogged from time to time and it is therefore customary to provide the strainer casing with a closure portion which may be removed when it is desired to take the strainer element out and clean it.

These strainers as constructed heretofore are open to the objection that when a portion of the casing is removed to permit access to the strainer element the liquid within the casing and feed pipe may escape thru the opened portion of the casing, and, even if the source of liquid supply is cut off before the strainer casing is opened up, considerable liquid may remain in the piping to escape thru the opening in the casing.

This escapage of liquid, when the strainer casing is opened up to clean the strainer, may not be particularly objectionable in a water pipe line, but is very objectionable in a pipe line conveying fuel oil or other liquids that will soil the floor and other objects with which it may come in contact.

An important feature of the present invention therefore resides in a strainer casing having a valve for cutting off the supply of liquid or gaseous fluid to the casing, and in means for automatically operating the valve to close the same before the cover plate is removed and for opening the valve as the cover plate is secured in place.

Other features of the invention reside in the construction of the valve and in the means for operating the same; in the means for securing the cover plate or closure in place, and in the means for retaining the strainer element in place within the casing.

The various features of the invention and novel combination of parts will be hereinafter described in connection with the accompanying drawings which illustrate one good practical form of the invention.

In the drawings:—

Fig. 1 is a top plan view of a strainer constructed in accordance with the present invention.

Fig. 2 is a side elevation of the strainer.

Fig. 3 is a vertical central sectional view thru the strainer.

Fig. 4 is a perspective view of the upper portion of the strainer showing the various elements disassembled and in spaced relation to each other.

Fig. 5 is a side elevation of the upper portion of the outer casing; and

Fig. 6 is a side elevation of the upper portion of the casing, and of the means for securing the cover plate in place.

The strainer of the present invention may be used in connection with pipe lines to remove dirt and foreign matter from either a liquid or gaseous fluid passing thru the pipe line, and the present invention is particularly well adapted for use in connection with the fuel supply pipes for fuel burners where it will serve to remove dirt and foreign particles which, if permitted to remain in the fuel, might clog the burner.

The strainer of the present invention is provided with a casing or receptacle 10 which may be given any desired construction and as shown is substantially cylindrical in shape. The upper portion of the casing 10 is somewhat enlarged as at 11 and this enlarged portion is provided with a threaded boss 12 adapted to be connected to a pipe that will deliver the fluid to be treated to the strainer.

In the construction shown, the casing 10 is provided with an inwardly extending annular shoulder 13 which is disposed at approximately the base of the enlarged portion 11 of the casing. The strainer element mounted within the casing 10 might be variously constructed and in the present case the strainer element 14 is shown as having a cylindrical or cup-shaped construction. The lower end of the strainer element 14 may be provided with a non-perforated cup portion 15 in which the dirt may accumulate, and the upper portion of the strainer element is provided with an annular flange plate 16 the under face of which may rest upon the shoulder 13. This construction serves to support the strainer element 14 in a suspended position within the casing 10, as clearly shown in Fig. 3, and the arrangement is such that the fluid entering the upper portion of the casing thru the threaded boss 12 will pass downwardly within the cup-shaped strainer element and the liquid will then pass outwardly thru the apertured walls of the strainer element into the chamber 17 and the strained liquid or gaseous fluid may escape from the chamber 17 thru a discharge pipe that may have threaded engagement with the outlet projection 18.

As stated, an important feature of the present invention resides in a valve for cutting off the supply of liquid or fluid to the strainer casing and in the means associated with the cover plate or closure for holding the valve open when the cover plate is in place and for moving the valve to its closed position as the cover plate is removed.

The valve may be variously constructed and in the construction shown consists of the ring-shaped element 19 adapted to be rotatably mounted within the enlarged annular portion 11 of the casing. The ring 19 has a hole 20 which is adapted to be aligned with the port 21 within the inlet boss 12, and the arrangement is such that when it is desired to admit the fluid to the strainer the ring 19 will be turned to the position shown in Fig. 3 in which the hole 20 lies in alignment with the port 21 and when it is desired to cut off the supply of fuel to the strainer casing the ring 19 is rotated to move the opening 20 out of alignment with the port 21. A simple and satisfactory means for retaining the ring 19 in place within the enlarged portion 11 consists of the spring ring 22 adapted to be snapped into the annular groove 23 formed in the inner wall of the casing, just above the upper end of the valve ring 19. It is desirable to limit the angle thru which the valve ring 19 may be rotated and to this end in the construction shown a notch 24 is formed in the lower edge of the ring 19 to clear a pin 25 that projects upwardly from the upper face of the shoulder 13. The arrangement is such that the rotative movement of the ring 19 will be limited by a shoulder at either end of the notch 24 striking against the pin 25.

The means for placing the valve under the control of the cover plate or closure 26 may be variously constructed, but in the present case the cover plate 26 is provided with a reduced portion 27 which fits snugly within the upper end of the casing, and the cover plate may be rotated relatively to the casing 10. A post 28 rigidly secured to the under face of the cover plate 26 is provided, and this post extends downwardly into a notch 29 formed in the ring valve 19, the arrangement being such that rotation of the cover plate 26 will turn the valve ring 19 to and from the valve closed position.

Since an important feature of the present invention resides in the construction whereby the cover plate cannot be removed until the valve has been closed, the means disclosed to this end will now be described. The cover plate 26 is provided with a bridge bar 30 having downwardly extending legs 31, at the lower ends of which are provided the inwardly extending portions 32. These portions 32 are adapted to engage ribs or flanges 33 formed integral with and projecting from the side walls of the casing 11. Each of these ribs or flanges 33 extends part way around the upper portion of the casing 11, as will be apparent from the drawing, and each of these ribs may be provided with a downwardly inclined portion 34 for a purpose to be described. The cover plate 26 is provided with the upstanding portion 35, and this upstanding portion has a laterally extending flange 36 which lies over the bridge bar 30, and a lug 37 projecting upwardly from the upper face of the cover plate 26 tends to retain the bridge bar within the housing formed by the upstanding portion 35 and flange 36.

When it is desired to secure the cover plate 26 to the strainer casing, the same is inserted in the upper end of the casing so that the downwardly extending arms 31 of the bridge bar will lie directly above the inclined portions 34 of the ribs 33, and as the cover plate is inserted in the upper end of the casing, the post 28 secured to the under face of the cover plate will enter the notch 29 of the ring. The cover plate 26 may then be rotated thru a substantial angle to cause the inwardly extending portions 32 of the bridge bar to engage the lower face of the curved ribs 33, and the rotative movement of the cover plate will serve to rotate the valve from the closed to the open position. This rotative movement may be arrested by one end of the bridge bar 30 striking against the inlet boss 12, as will be apparent from Figs. 1 and 2, and it will be noted from Fig. 1 that while the parts are in this position the hole 20 lies in alignment with the port 21. After the parts have been rotated to this position it is desirable to exert a substantial downward pressure upon the cover plate 26 to force the same into firm engagement with the upper end of the casing to prevent liquid from escaping around the cover plate. This is accomplished, in the construction shown, by means of a thumb screw 38 which is loosely inserted thru a hole 39 formed within the flange portion 36 and the lower portion of the thumb screw is screwed into the threaded hole 40 formed in the bridge bar 30, the arrangement being such that rotation of the thumb screw 38 will pull the bridge bar 30 upwardly into firm clamping engagement with the ribs 33 while at the same time it will press the cover plate 26 downwardly into snug engagement with the upper end of the casing 10. Since the cover plate 26 fits snugly in the upper end of the casing 10, a substantial amount of force may be required to disengage the cover plate from the upper end of the casing, and to this end the inclined portion 34 of the ribs 33 are provided against which the lower ends of the bridge bar may be forced when the same is turned in a contra-clockwise direction, viewing Fig. 1, the arrangement being such that as the lower ends of the bridge bar slide along the upper camming face of the portions 34 the bridge bar will be forced upwardly and this will unseat the cover plate from the upper end of the casing. This is not an essential feature, however, and if desired the inclined portions 34 may be omitted, particularly as the coiled spring to be described tends to lift the cover plate 26 from the casing.

It is desirable to provide means for holding the flange 16 at the upper end of the straining element firmly seated upon the shoulder 13 so that the straining element may not rise under the lifting action of the liquid. To this end, in the construction shown, the cover plate 26 is provided with a central post 41 which may be screwed into a hole in the underface of the cover plate. The post 41 is provided with a head 42 and a disk 43 is mounted upon the post 41 and is retained in engagement with the post by the head 42. A coiled spring 44 is mounted upon the post 41 and is confined between the under face of the cover plate and the disk 43. The arrangement is such that when the cover plate is in its closed position, the spring serves to hold the disk 43 in yielding engagement with the flange 16 of the strainer element to thereby hold this flange firmly seated upon the shoulder 13. A plug 45 may be screwed in the lower end of the casing 10 which may be removed from time to time to draw off the water that may collect in the lower portion of the casing below the oil.

From the above description and the disclosure of the drawings, it will be seen that the cover plate 26 cannot be removed from the strainer casing until after the valve has been moved to its closed position, and as a result fluid cannot enter the strainer casing thru the supply pipe except when the cover plate is in place. In this manner the oil or other liquid within the piping system to which the strainer casing is secured is prevented from overflowing at the top of the casing when the cover plate is removed.

What is claimed is:—

1. A strainer, comprising in combination, a casing, a removable cover for the casing adapted to be rotated in one direction to secure it to the casing and in the opposite direction to release it, a rotating valve for controlling the supply of fluid to the casing, a strainer element within the casing, and a freely disengagable connection between the cover and valve for rotating the valve to its closed position as the cover is turned to its released position and adapted to turn the valve to its open position as the cover is turned to its secured position.

2. A strainer, comprising in combination, a casing, a removable cover for the casing, means for securing the cover to the casing and adapted to be rotated in one direction to secure the cover to the casing and in the opposite direction to release the cover, a rotating valve for controlling the supply of fluid to the casing, a strainer element within the casing and adapted to be removed from the casing independently of the valve, and a connection between the valve and said securing means and adapted to rotate the valve to its open position as the securing means is moved to the cover securing position and to move the valve to its closed position as the securing means is moved to its cover releasing position.

3. A strainer, comprising in combination, a casing having means for conducting the fluid to be strained into the casing, a closure for the casing constructed to be rotated relatively to the casing when it is applied and removed, a strainer element mounted within the casing and adapted to be removed when it is to be cleaned, a valve for controlling the flow of fluid into the casing, means associated with the closure for imparting its rotative movement to the valve to actuate the valve, and means for securing the closure to the casing and operable to secure the closure in place when the valve is open and to release the closure only when the valve is closed.

4. A strainer, comprising in combination, a casing having a removable cover, means for delivering the fluid to be strained to the casing, a rotating valve for controlling the supply of fluid to the casing, mechanism for securing the cover to the casing, a strainer element within the casing and supported independently of said valve, and means for automatically rotating the valve to its open position as said mechanism is actuated to secure the cover in place and operable to automatically rotate the valve to the closed position as the mechanism is actuated to release the cover.

5. A strainer, comprising in combination, a casing having a removable closure adapted to be rotated relatively to the receptacle, means for delivering the fluid to be strained to the casing, a valve for controlling the flow of fluid to the casing and adapted to be turned to and from the closed position by the rotation of said closure, a strainer element within the casing and adapted to be removed independently of the valve, and means for securing the closure to the casing and operable to open the valve as the securing means is moved to the cover securing position.

6. A strainer, comprising in combination, a casing having a port in a side wall, a rotating valve for closing said port, comprising a ring rotatably mounted in the casing and having a hole in a wall thereof which is adapted to be moved into and out of alignment with the port as the ring is rotated, a cover for the casing and adapted to be rotated to rotate said ring, and a positive driving connection between the cover and ring whereby the former may be turned to move the latter to and from its valve closed position.

7. A strainer, comprising in combination, a casing having means for conducting the fluid to be strained into the casing, a closure for the casing constructed to be rotated relatively to the casing in applying and removing the same, a strainer element removably mounted in the casing, a rotating valve for controlling the flow of fluid into the casing and provided with stops for limiting its rotative movement, means associated with the closure for imparting its rotative movement to the valve to actuate the latter, and means for securing the closure to the casing and operable to release the closure only upon movement of the closure to the valve closing position.

8. A strainer, comprising in combination, a casing, a removable cover for the casing, a strainer within the casing, a valve for controlling the supply of fluid to the casing, means associated with the cover for moving the valve to and from its closed position, clamping means for the cover comprising a bridge bar extending across the cover and means upon the casing for exerting a camming action upon the bridge bar to force the cover out of engagement with the casing.

9. A strainer, comprising in combination, a casing having a removable cover and having a port in a side wall, a rotating valve for closing said port, comprising a ring rotatably mounted within the casing and having a hole formed in a wall thereof which is adapted to be moved into and out of alignment with the port as the ring is rotated, a strainer element within the casing and supported so as not to partake of the valve movement, and clamping means for securing the cover in place and adapted to hold the valve open while in its cover securing position and to close the valve as it is moved to the cover releasing position.

10. A strainer, comprising in combination, a casing having a removable cover, means for delivering the fluid to be strained to the casing, a strainer element within the casing, flanges projecting from the opposite sides of the casing near its upper end, a bridge bar secured to and extending across the upper face of the cover and having downwardly extending flange engaging portions for securing the bridge bar and cover to the casing, and inclined cam faces upon said flanges adapted to be engaged by the bridge bar to force the latter and cover away from the upper end of the receptacle.

11. A strainer, comprising in combination, a casing, a removable cover for the casing adapted to be rotated in one direction to secure it to the casing and in the opposite direction to release it, a rotating valve for controlling the supply of fluid to the casing, a strainer element within the casing, and a driving connection between the cover and valve disposed at one side of the axis about which the valve rotates and comprising a projection extending from one into driving engagement with the other to turn the valve to its open position as the cover is secured to the casing and to close the valve as the cover is turned to its released position.

12. A strainer, comprising in combination, a casing, a removable cover for the casing adapted to be rotated in one direction to secure it to the casing and in the opposite direction to release it, a rotating valve for controlling the supply of fluid to the casing, a strainer element within the casing, and adapted to be removed from the casing without removing the valve, and a connection between the valve and said cover comprising a projection extending from one into positive engagement with the other to impart the rotative movement of the cover to the valve.

13. A strainer comprising in combination, a casing, a removable cover for one end of the casing and adapted to be rotated relatively to the casing in applying and removing the same, a strainer element mounted in the casing and adapted to be removed to cleanse the same, a rotating valve for controlling the supply of fluid to the casing and constructed and arranged so as not to be disturbed by the movement of the strainer element to and from its operative position, and a driving connection between the cover and valve and adapted to rotate the valve to its closed position as the cover is rotated to its released position.

14. A strainer comprising in combination, a casing, a removable cover for one end of the casing and adapted to be rotated relatively to the casing in applying and removing the same, a ring valve mounted in the casing to control the supply of fluid to the casing and adapted to be rotated to and from its closed position by the rotative movement of the cover, and a strainer element for the casing and constructed to be moved to and from its operative position within the casing by passing the strainer element through the ring valve.

15. A strainer comprising in combination, a casing, a cover for the casing provided with securing means adapted to be moved from its cover securing position to its cover releasing position by rotation of the cover through less than one complete revolution, a rotating valve for controlling the flow of fluid to the casing, means for imparting the rotating movement of the cover to the valve to turn the latter to and from its closed position, and a strainer element within the casing.

In testimony whereof, I have signed my name to this specification.

GEORGE P. GREGORY.